(12) United States Patent
Waddington et al.

(10) Patent No.: US 8,640,140 B2
(45) Date of Patent: Jan. 28, 2014

(54) ADAPTIVE QUEUING METHODOLOGY FOR SYSTEM TASK MANAGEMENT

(75) Inventors: Daniel Waddington, Morgan Hill, CA (US); Chen Tian, Fremont, CA (US)

(73) Assignee: Samsung Electronics Co., Ltd., Suwon (KR)

( * ) Notice: Subject to any disclaimer, the term of this patent is extended or adjusted under 35 U.S.C. 154(b) by 240 days.

(21) Appl. No.: 13/077,567

(22) Filed: Mar. 31, 2011

(65) Prior Publication Data

US 2012/0102501 A1 Apr. 26, 2012

Related U.S. Application Data

(60) Provisional application No. 61/406,537, filed on Oct. 25, 2010.

(51) Int. Cl.
*G06F 9/46* (2006.01)
(52) U.S. Cl.
USPC .......................................... 718/105; 718/100
(58) Field of Classification Search
None
See application file for complete search history.

(56) References Cited

U.S. PATENT DOCUMENTS

| | | | |
|---|---|---|---|
| 8,099,565 B2 * | 1/2012 | Seelam et al. ................ | 711/154 |
| 2010/0125843 A1 | 5/2010 | Saito et al. | |
| 2010/0293353 A1 * | 11/2010 | Sonnier et al. ................ | 711/170 |
| 2011/0161976 A1 | 6/2011 | Alexander et al. | |
| 2012/0102500 A1 | 4/2012 | Waddington et al. | |

OTHER PUBLICATIONS

S. Agarwal, R. Barik, D. Bonachea, V. Sarkar, R. K. Shyamasundar, and K. A. Yelick. Deadlock-free scheduling of x10 computations with bounded resources. In SPAA, pp. 229-240, 2007.
R. D. Blumofe and C. E. Leiserson. Scheduling multithreaded computations by work stealing. In Symposium on Foundations of Computer Science, pp. 356-368, 1994.
P. Charles, C. Grothoff, V. A. Saraswat, C. Donawa, A. Kielstra, K. Ebcioglu, C. von Praun, and V. Sarkar. X10: An object-oriented approach to non-uniform cluster computing. In OOPSLA, pp. 519-538, 2005.
D. L. Eager, E. D. Lazowska, and J. Zahorjan. A comparison of receiver-initiated and sender-initiated adaptive load sharing. Performance Evaluation, 6(1):53-68, 1986.
M. Frigo, C. E. Leiserson, and K. H. Randall. The implementation of the cilk-5 multithreaded language. In PLDI, pp. 212-223, 1998.
Y. Guo, R. Barik, R. Raman, and V. Sarkar. Work-first and help-first scheduling policies for async-finish task parallelism. In IPDPS, pp. 1-12, 2009.
M. M. Michael and M. L. Scott. Simple, fast, and practical non-blocking and blocking concurrent queue algorithms. In PODC, pp. 267-275, 1996.
E. Mohr, D. A. Kranz and R. H. Halstead Jr. Lazy task creation: A technique for increasing the granularity of parallel programs. IEEE Transactions on Parallel and Distributed Systems, 2, 1991.

(Continued)

*Primary Examiner* — Kenneth Tang
(74) *Attorney, Agent, or Firm* — Kenneth L. Sherman, Esq.; Michael Zarrabian, Esq.; Sherman & Zarrabian LLP

(57) ABSTRACT

A task management methodology for system having multiple processors and task queues adapts a queuing topology by monitoring a queue pressure and adjusting the queue topology from a selection of at least two different queue topologies. The queue pressure may be periodically monitored and queues with different granularities selected. The methodology reduced contention when there is high pressure on the queues while also reducing overhead to manage queues when there is less pressure on the queues.

21 Claims, 14 Drawing Sheets

(56) References Cited

OTHER PUBLICATIONS

F. Bellosa. Locality information based scheduling in shared memory multiprocessors. In Workshop on Job Scheduling Strategies for Parallel Processing, pp. 271-289, 1996.

R. D. Blumofe, C. F. Joerg, B. C. Kuszmaul, C. E. Leiserson, K. H. Randall, and Y. Zhou. Cilk: an efficient multithreaded runtime system. PPOPP, pp. 207-216, 1995.

S. Chen, P. B. Gibbons, M. Kozuch, V. Liaskovitis, A. Ailamaki, G. E. Blelloch, B. Falsafi, L. Fix, N. Hardavellas, T. C. Mowry, and C. Wilkerson. Scheduling threads for constructive cache sharing on cmps. SPAA, pp. 105-115, 2007.

Y. Guo, J. Zhao, V. Cave, and V. Sarkar. Slaw: a scalable locality-aware adaptive work-stealing scheduler for multi-core systems. PPoPP, pp. 341-342, 2010.

V. Karamcheti and A. A. Chien. A hierarchical load-balancing framework for dynamic multithreaded computations. SC, pp. 1-17, 1998.

E. P. Markatos. Scheduling for locality in shared-memory multiprocessors. PhD thesis, Rochester, NY, USA, 1993.

Y. Yan, X. Zhang, and Z. Zhang. Cacheminer: A runtime approach to exploit cache locality on smp. IEEE Trans. Parallel Distrib. Syst., 11: 357-374, 2000.

U.S. Non-Final Office Action for U.S. Appl. No. 13/077,612 mailed Jul. 3, 2013.

\* cited by examiner

ADAPTIVE QUEUING METHODOLOGY FOR SYSTEM TASK MANAGEMENT

CROSS REFERENCE TO RELATED APPLICATIONS

The present application claims the benefit of provisional application 61/406,537, filed on Oct. 25, 2010, by Waddington et al. "Scalable Lightweight Task Management Schemes For MIMD Processors," the contents of which are hereby incorporated by reference.

FIELD OF THE INVENTION

The present invention is generally related to task management in a multi-threaded architecture having multiple processor cores. An exemplary task management environment is a Multiple Instruction Multiple Data (MIMD) processor architecture including a Non-Uniform Memory Architecture (NUMA).

BACKGROUND OF THE INVENTION

Multiple Instruction Multiple Data (MIMD) processors are becoming increasingly viable for realizing enhanced performance in embedded applications, particularly for compute intensive applications that do not lend themselves to other types of processors. The number of cores in a MIMD processor has increased over time with a 64-core Tile processors being one example. This raises various issues associated with scalability as the number of processor cores increases.

MIMD designs form the basis of most multicore processors that are not Graphics Processing Units (GPUs). A typical MIMD processor is made up of multiple Central Processing Unit (CPU) cores that are arranged on-chip and interconnected using a high-speed switched network. The MIMD design may or may not be fully cache coherent. The interconnect provides both core-to-core communications as well as data transfers between memory controllers and I/O systems. This hardware design is aimed at sustaining performance scaling as the number of cores increases to tens, hundreds and even thousands of cores.

This type of MIMD architecture requires careful consideration of software design and implementation with respect to parallel execution. The conventional approach to building concurrent software is through the use of multithreaded programming APIs such as those found in Portable Operation System Interface (for Unix) (POSIX)-based operating systems. Nevertheless, multithreaded programming is relatively heavyweight and does not scale well for large numbers of tasks as complexity becomes difficult to manage. One of the key reasons for this is that multithreaded programming APIs provide a very low level of abstraction and put the onus on the developer to ensure that they are used correctly. This is a task that becomes inherently difficult in the many core arena.

An alternative approach to concurrent software development is to use language-level solutions that explicitly provide support for concurrency, reducing program complexity through abstraction. Many of these originated from the High Performance Computing (HPC) arena where there has for many years existed the need to build large-scale concurrent applications. However, these language-level solutions are not suited to embedded systems development because they focus on distributed clusters and use heavyweight runtimes that are only acceptable for long-running jobs.

Closer to the embedded systems community there have been other efforts to provide language-level support for concurrent programming. Examples include Google's GO™ Microsoft's F#™, Apple's Grand Central Dispatch (GCD)™ and, Intel's Cilk™ and Thread Building Blocks (TBB)™.

One thing that is common to many of these language-level supports for concurrent programming is that they rely on application-managed concurrency in the form of lightweight tasks. Lightweight tasks can be created and scheduled by the application in user-space and do not carry the overhead of broader OS-level attributes such as security permissions and memory allocations. They are the ideal vehicle for realizing fine-grained application concurrency with a low system overhead.

There are a variety of parallel programming solutions for lightweight task management in MIMD multi-core processors. Exemplary solutions include OpenMP™, Cilk™, Intel TBB™ and Apple GCD™.

Language extensions for lightweight task management allow programmers to create thousands or millions of units of concurrent execution that can be simultaneously performed by different threads running on multiple processing cores. Consequently, task management is increasingly becoming a problem in MIMD multi-core processor systems. Therefore, what is desired is improved task management methods and systems.

SUMMARY OF THE INVENTION

An apparatus, system, method, and computer program product permits queue topology in a MIMD architecture to be dynamically adapted based on monitored queue pressure. An exemplary system includes multiple processors connected by communication links and a task management system to monitor queue pressure and adapt queue topology. The granularity of the queue topology may be adjusted to reduce contention penalties when there is high pressure on the queues and also adapted to reduce queue overhead when there is less pressure on the queues. In one embodiment of a method a task queue pressure is monitored. The queue topology is adapted based on the monitoring of task queue pressure with respect to at least one threshold level associated with queue pressure, wherein the queue topology is selected from at least two different queue topologies.

DETAILED DESCRIPTION

Figure 1A:
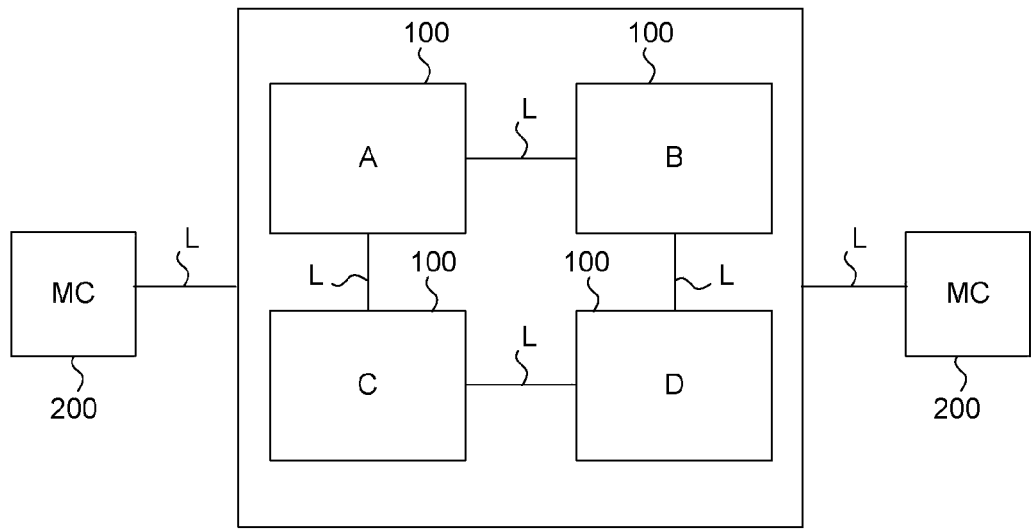
FIGS. 1A and 1B illustrate MIMD processor architectures.
Figure 1B:
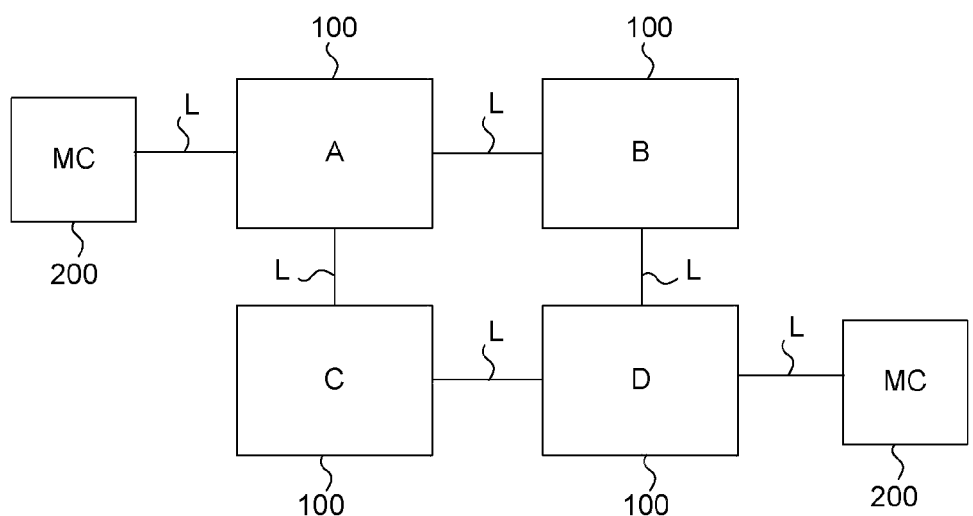

One embodiment of the present invention is a task management scheme that may be used for lightweight task management in a Multiple Instruction Multiple Data (MIMD) architecture. Referring to FIGS. 1A and 1B, in a MIMD architecture there are multiple processor cores 100 coupled by communication links, L. There are also memory controllers 200 in the MIMD architecture to access memory resources. In a Non-Uniform Memory Access (NUMA) architecture the memory access time depends on the memory location relative to a processor. In a NUMA architecture a process can access local memory faster than non-local memory.

Figure 2:
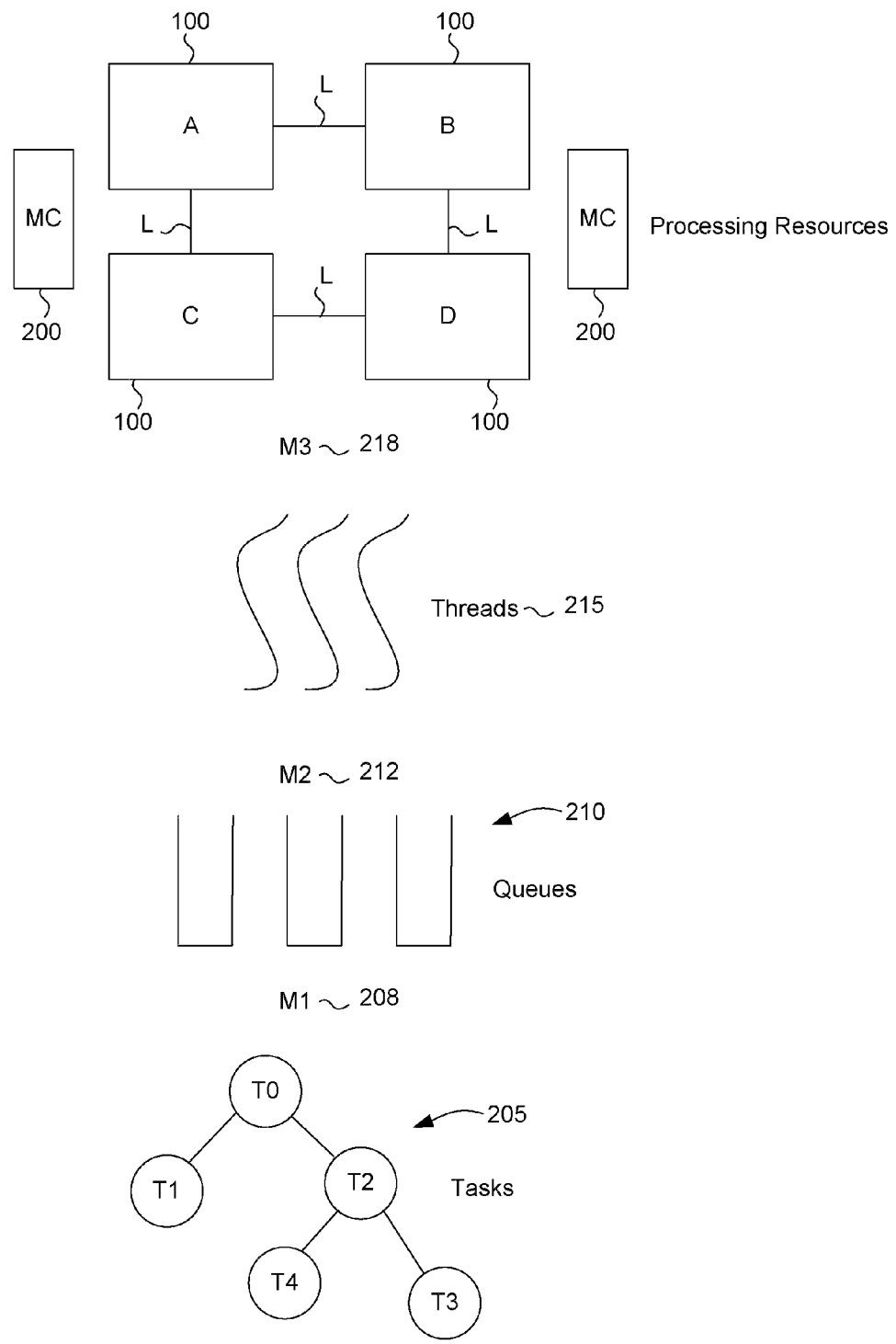
FIG. 2 illustrates logical task management in MIMD processor architectures.

As illustrated in FIG. 2, in a lightweight task management model a sequence of tasks 205 is generated. An individual task may also generate other tasks in a tree of tasks. That is a task T0 may generate child tasks T1 and T2, etc. The tasks are mapped 208 to task queues 210 by a mapping M1. Elements in task queues are mapped 212 to time multiplexed threads 215 of execution by mapping M2. In turn, the threads 215 are mapped 218 to individuals processors 100 by a mapping M3, such as individual processor cores 200-A, 200-B, 200-C, and 200-D.

As will be described in more detail, the task queues 210 have an associated queue topology. These different possible queuing topologies reflected different tradeoffs in terms of queue management resources and performance hits related to contention if the queues become overloaded. The inventors have recognized that conventional static queue topologies have drawbacks, particularly if task generation/consumption varies over time.

The mapping M3 of threads to processing resources is conventionally performed in a hardware agnostic manner. However, the inventors have recognized that in some MIMD configurations this can result in significant memory access penalties.

Figure 3:
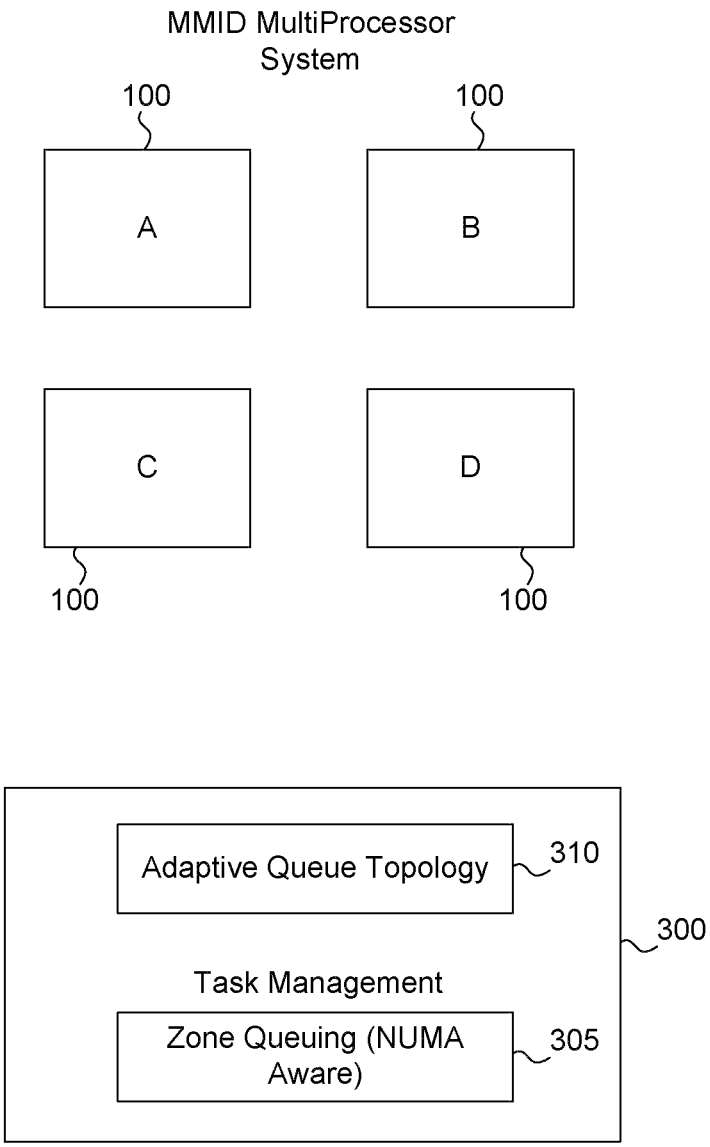
FIG. 3 is a high level block diagram illustrating task management in accordance with an embodiment of the present invention.

Referring to FIG. 3, embodiments of the present invention includes several aspects related to a task management architecture 300 that may be used either separately or in combination. These include a new zone based queuing architecture 305 for task management that leverages NUMA architecture-specific memory controller topologies to map threads to processing resources and also an adaptive queue topology 310 for MIMD architectures that dynamically reconfigures the task queuing topology based on monitoring the "pressure" on one or more task queues.

NUMA-Aware Zone Queue Approach

In one embodiment of the present invention the task management is aware of the underlying NUMA architecture. As the number of processing cores has increased in NUMA architectures there is the potential for there to be significant differences in memory access costs if a processor is used that is far away from the associated memory controller required to access memory.

The NUMA Aware approach provides the benefits of reducing the communication cost between cores and the memory controllers, reducing the communication costs between cores, reducing contention on memory controllers, and is applicable in hardware systems.

For NUMA-based multicore and manycore processors, the communication cost between cores and memories are different because of the distribution of memory controllers and different data transfer costs between cores.

A critical component of the run-time system is the task manager/scheduler. The role of the task manager 300 is to map logical program tasks to physical processing resources, as described in FIGS. 2-3. A task manager 300 performs task scheduling both spatially (distribution across cores) and temporally (time slicing).

One embodiment of the present invention is a novel task management scheme that takes advantage of NUMA processor designs by optimizing task placement according to NUMA-driven memory performance. Processing cores, with associated lightweight tasks, are mapped to memory controllers in clusters, herein termed a "zone." Zone assignments are made such that some cost function is minimized and the cost per zone is substantially the same for each zone. Mapping of tasks to clusters can use an arbitrary cost function.

Figure 4A:
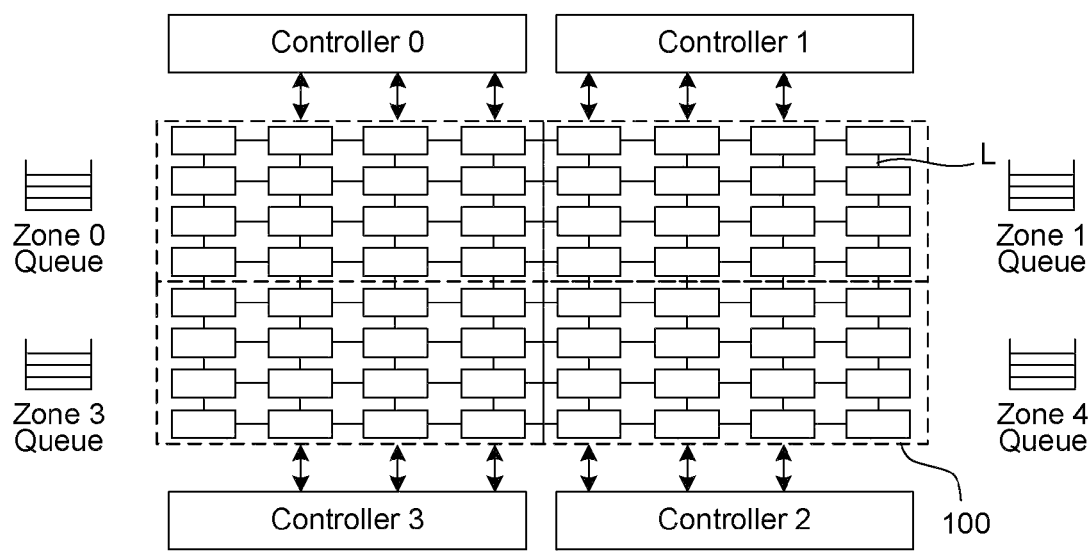
FIGS. 4A and 4B illustrate zone queuing in a multi-core processor in accordance with an embodiment of the present invention.

Referring to FIG. 4A, an exemplary 64 core Tile processor is illustrated having four memory controllers, controller 0, controller 1, controller 2, and controller 3 where there are 64 individual processor cores 100 and links L. The cores are assigned to four different zones, which in this example correspond to four quadrants of the processor for a zone 0, zone 1, zone 2, and zone 3 that are each serviced by respective memory controllers controller 0, controller 1, controller 2, and controller 3, respectively. Each zone has its own task queue, i.e. a zone 0 queue, a zone 1 queue, a zone 2 queue, and zone 3 queue. As a result the cores 100 are clustered with respect to the communication cost between cores and controllers, the potential number of load instructions executed by each core/task, and the capacity of memory controllers. In the implementation in FIG. 4A after the logical division, exactly one task queue (or one queue a particular class of task in an implementation having queues dedicated to specific classes of tasks) is maintained for each zone. In one embodiment the default rule is that tasks created by a thread executing on a given core are placed on the queue for the zone in which the core resides. Another default rule is that memory allocated by a task must be taken from the assigned memory controller. In servicing tasks, a thread first checks the queue for its local-zone.

This approach can also be adapted to permit work stealing. In work stealing if the queue for a zone is empty, the thread checks the queues for other adjacent zones using nearest neighbor first policy. Thus, this approach has a preference for threads first servicing the queue for its local zone before engaging in work stealing to search for work from other zones.

This zone queuing approach can be generalized to more arbitrary NUMA architectures. In a NUMA architecture the memory access time depends on the memory location relative to a processor. In one embodiment the approach is to arrange task queues according to memory controller topology to reduce unnecessary memory access penalties. As previously described, there may be different types of task queues for different types of tasks, such as A, C, and Y tasks, which are described below in more detail. The use of different types of task queues is illustrated in FIG. 4B.

Figure 4B:
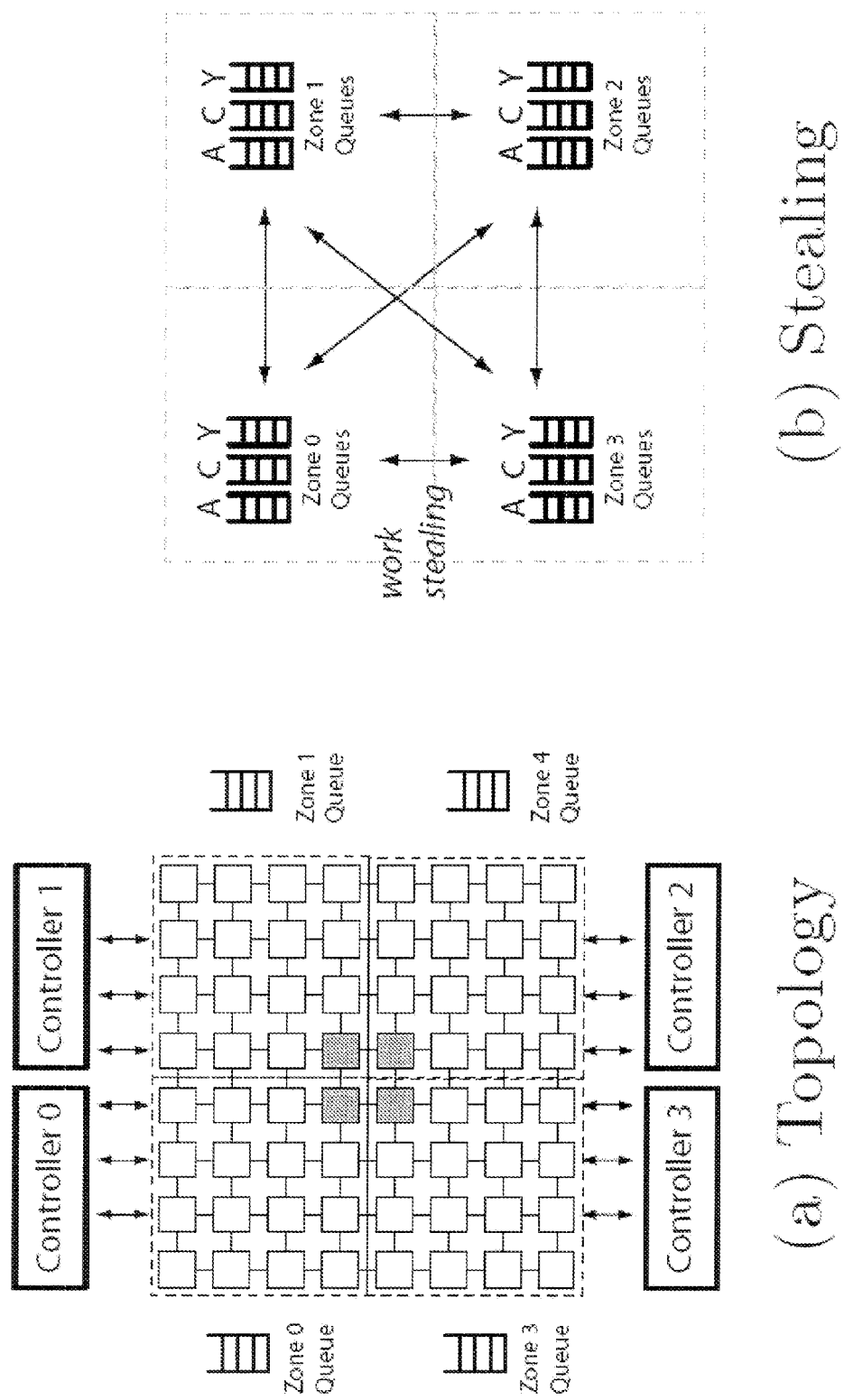

In one embodiment the zone queue scheme maintains one set of queues for each memory controller and tile quadrant (see FIG. 4B). Tasks created by a thread executing on a given tile are placed on the appropriate queue (e.g., A, C, or Y) for the zone in which the tile resides. In servicing tasks, a default rule in a zone queue scheme is that a thread for a tile first checks the appropriate queue belonging to the local-zone to reduce memory access penalties. However, memory access costs are not the only performance consideration and it is desirable to have other rules if the thread is idle and can do work for other zones. In one embodiment, if the queue is empty, then appropriate queues (e.g., A queues in this example) in adjacent zones are checked using a nearest-neighbor first policy. For example, a tile in zone 0 will first check zone 1 and 3, and then finally zone 2 (refer to FIG. 4B). If all of the A queues are empty, then the thread will attempt to service C and Y queues respectively. In one implementation the memory allocated by a task is taken from the nearest memory controller for the quadrant. If the local memory banks are fully allocated, then an adjacent bank can be used.

The zone-queue architecture brings performance benefits to heavily loaded and data intensive applications. This approach localizes cache and memory traffic (including coherency traffic) by reducing the need to communicate across the tile array particularly with respect to cache misses passing all the way through to main memory.

Furthermore, it helps to improve cache performance by localizing consumer/producers and helping to increase the likelihood of cache hits for task data structures. Task management overhead is also reduced by limiting the average migration distance of tasks between cores.

The concept of zone-queuing can be easily extended to support hierarchical queues that are structured according to core, memory and cache topologies. For example, the scheme may be extended to support hierarchical queues for 1, 2×2, and 4×4 zone topologies.

Figure 5:
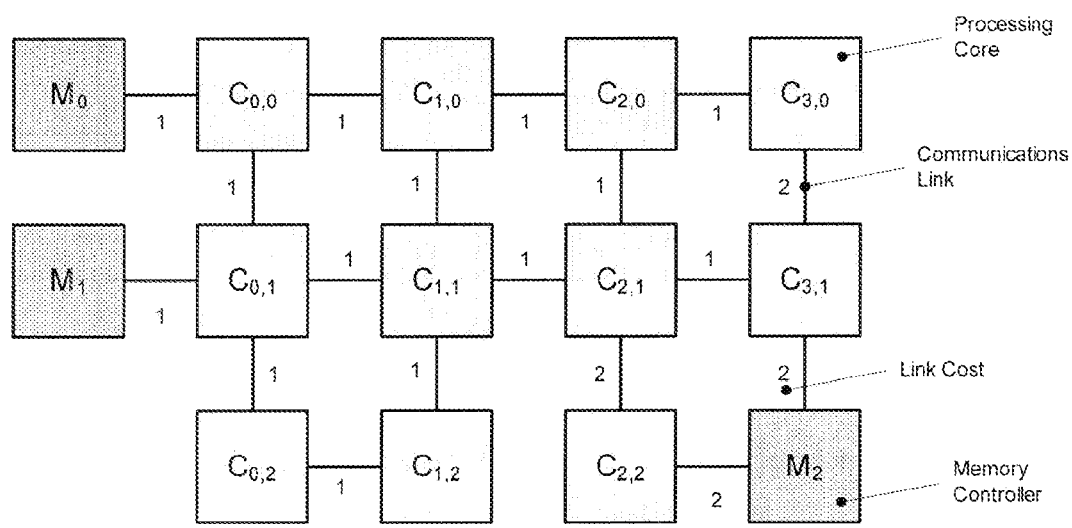
FIG. 5 illustrates a NUMA example and FIG. 6 illustrates the formation of zones for the NUMA example of FIG. 5.

FIG. 5 illustrates a more general example of zone queuing in a NUMA architecture in which for the purposes of illustration there is greater asymmetry in regards to memory controller arrangement and link costs. A set of processing cores C is provided. The processors are connected to each other and to memory controllers, M, by associated communication links. Each link, in turn has an associated link cost. In this example, the link cost need not be uniform along each link. The link cost may be any common metric such as link latency. The problem then is to create zones, Z, for each different memory controller based on the link cost. Let C be a set of interconnected cores $\{C_{x,y}\}$, M a set of memory controllers $\{M0 \ldots Mm\}$, Q is the set of queue zones $\{Z0, \ldots Zm\}$, $l(x,y)$ is a load function That gives the number of memory access instructions executed on core $C_{x,y}$. Then let a least NUMA coast (distance) be as follows:

$$d(c,x,y): 0 \le c \le M, C_{x,y} \in C$$

Then divide the cores into m zones such that the total cost defined by the following equation is minimized:

$$\square \sum_{0 \le m \le M}^{m} \left( \sum_{c_{x,y} \in Z_m}^{x,y,m} d(m,x,y) \cdot l(x,y) \right)$$

The next step is to allocate one queue (or one set of queues, depending on the implementation, as previously described) for each zone. In one embodiment the threads are created and affinity is set between the threads and the cores such that one thread is executed on one core. Then ensure that the threads within a zone allocate memory from the nearest controller, i.e., the one assigned to the zone.

Figure 6:
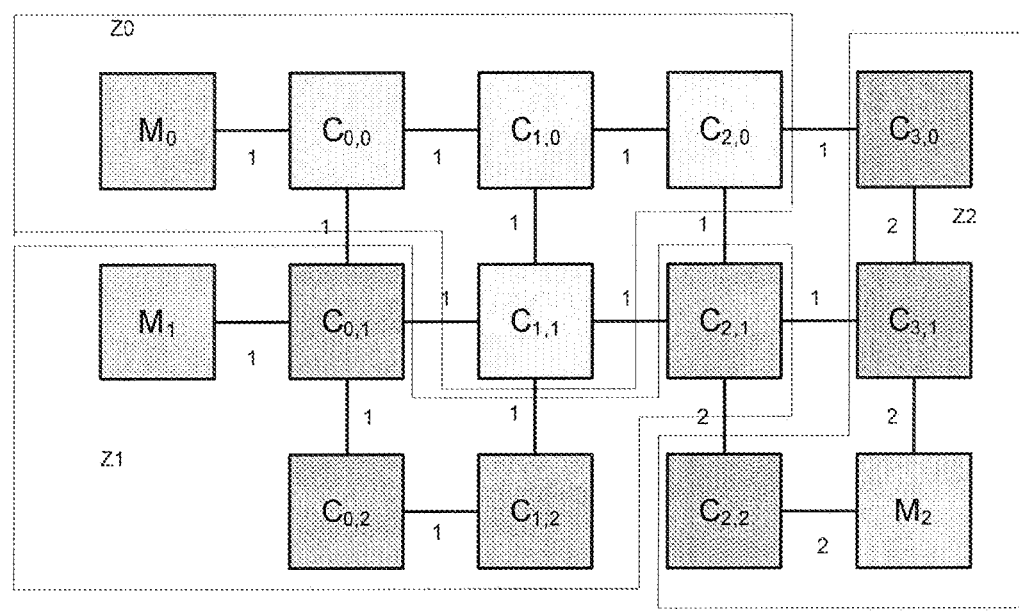

In the example illustrated in FIG. 6 there are three memory controllers M0, M1, and M2 for a set of 11 cores. There is one zone per memory controller, or three different zones with the cores being assigned based on a cost function such that the cost function is minimized with each zone preferably having substantially the same cost. However, note that in some situations that the cost per zone may not be identical and does not have to be identical in order to minimize the cost function. In this example, assume a constant unit load: $l(x,y)=1$. The following three zones should be created, which is illustrated in FIG. 6:

$Z_0 = \{(0,0),(1,0),(1,1),(2,0)\}$ cost=9

$Z_1 = \{(0,1),(0,2),(1,2),(2,1)\}$ cost=9

$Z_2 = \{(3,1),(2,2),(3,0)\}$ cost=8

In one embodiment during execution, after a thread created a task it pushes the task into the queue for its local zone. When a thread searches for a task, it first tries to get one from the queue for its local zone. If the queue is empty, the thread checks the queues for other adjacent zones using a nearest neighbor first policy.

Figure 7:
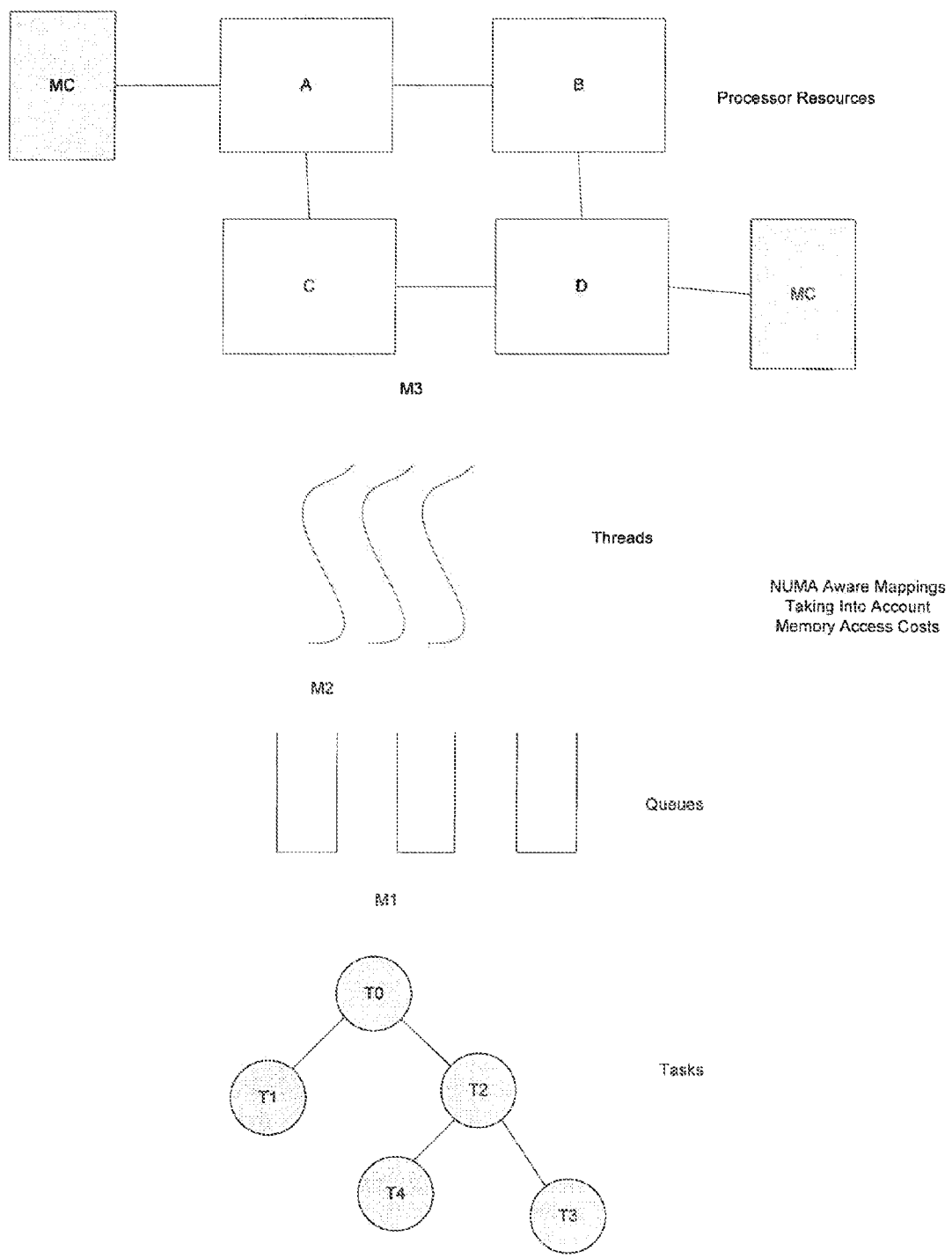
FIG. 7 illustrates NUMA aware mappings in logical task management.
Figure 8:
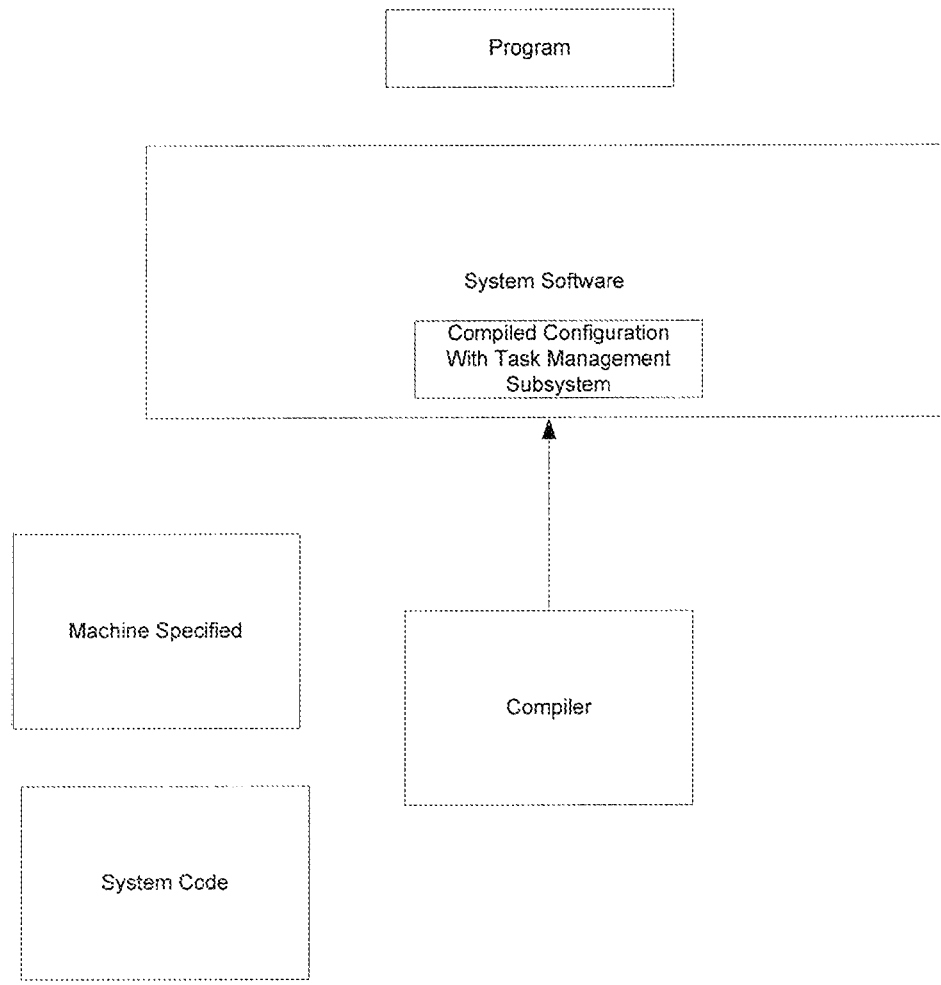
FIG. 8 illustrates run time compilation of NUMA aware task management.

One way to understand NUMA aware task management is that the mappings performed by the task management subsystem related to mapping threads from task queues to processor cores and hence to memory controller are arranged to be NUMA aware. That is referring to FIG. 7 the use of zone queuing and setting the affinity of threads results in NUMA aware mappings that minimize performance penalties associated with non-uniform memory access times. Referring to FIG. 8, the task management subsystem may be configured at compiler time based on the target NUMA architecture.

It will also be understood from FIG. 8 that the method of task management that is NUMA aware may be implemented as a non-transitory computer readable medium storing the code for the task management compilation. Additionally, the run time compiled code may also reside on a local memory that is a computer readable medium.

Queue Topologies and Adaptive Queue Approach

Figure 9:
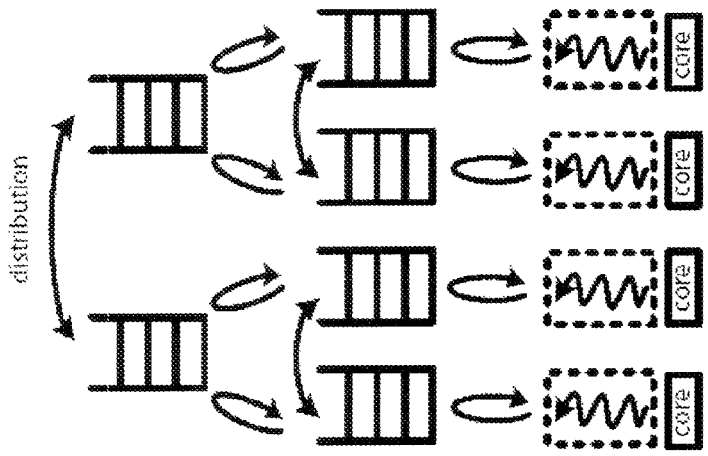
FIG. 9 illustrates three exemplary queuing topologies.
Figure 9:
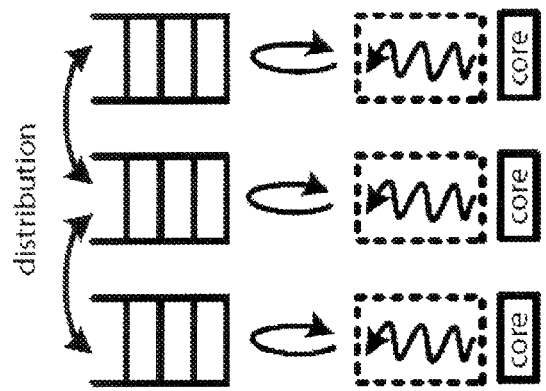
Figure 9:
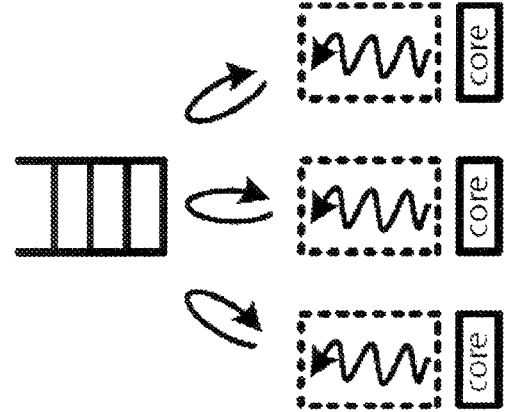

There are a number of ways in which task queues for lightweight tasks can be distributed and/or shared across multiple cores/threads. Several exemplary topologies are shown in FIG. 9. The conventional approach is to utilize a single queuing topology in a static configuration. However, as will be discussed in more detail later, one embodiment of the present invention adaptively changes the queuing topology.

The most straightforward of the queuing topologies to implement, in a shared memory MIMD environment, is a single global queue that is shared across multiple threads running on separate cores (refer to FIG. 9a). This scheme has the advantage that there is no overhead associated with the migration of tasks. In low-load situations (where load pertains to tasks creation/servicing volume) this approach works well and minimizes the "cost of concurrency."

Nevertheless, in heavy load or large numbers of cores, the centralized queue can become a point of contention; intense producer/consumer pressure on a single queue can result in significant performance degradation.

Historically, more attention has been given to distributed queuing schemes whereby each thread in the system has a local queue which it services (refer to FIG. 9b). Tasks are load balanced across the queues by task migration either by being pushed by the task creator (work-sharing) or pulled by the task consumer (workstealing).

Distributed queuing schemes help to alleviate pressure on the queues in high-load situations by reducing producer/consumer contention. However, overhead is incurred through additional operations required for load balancing and task migration. From the context of embedded systems and potentially low-load applications they may not be the best choice for optimal performance.

Queues can also be arranged hierarchically (refer to FIG. 9c) so that stealing is spatially localized among groups of queues before coarser-grained stealing across higher-level queues.

Queues that are shared across multiple threads, either within shared memory or through explicit coherency, must be appropriately synchronized. A basic "safe" queue design is to, protect each queue with a single lock. Each time a thread accesses a queue it must first take the lock. When the thread has completed its operation it releases the lock and access to the queue is made mutually exclusive.

As previously discussed, queuing architectures range from a single coarse-grained shared queue, with no need for work-stealing, to fine-grained per-core queues coupled with work-stealing. As discussed previously, heavy task loads are better suited to schemes that support multiple queues and thus relieve pressure on any single queue. Nevertheless, fine-grained queues come at a cost. Checking of multiple queues and migration of tasks between them all cost computational overhead. In light loading situations, coarse-grained queues can provide efficient task management scheme with least incurred overhead. If the approach is too fine-grained however, excessive task migration distance can also impact performance. However, during low-load conditions the overhead of task stealing and synchronization across queues can be reduced and even eliminated through the use of zone or global queue schemes.

The problem of deciding queue-granularity becomes an issue of application behavior with respect to task creation, which of course may potentially change over time. To help address this problem an embodiment of the present invention includes an adaptive queuing scheme that changes the queue arrangement and granularity over time in response to runtime pressure measurement in the system.

Language extensions for lightweight task management allow programmers to easily create thousands or millions of units of concurrent execution that can be simultaneously performed by different threads running on multiple processing cores (in the context of multicore or manycore processors). In the context of a system that supports lightweight tasks, optimization of the underlying task management 300 is a critical to achieving good overall system performance.

Figure 10A:
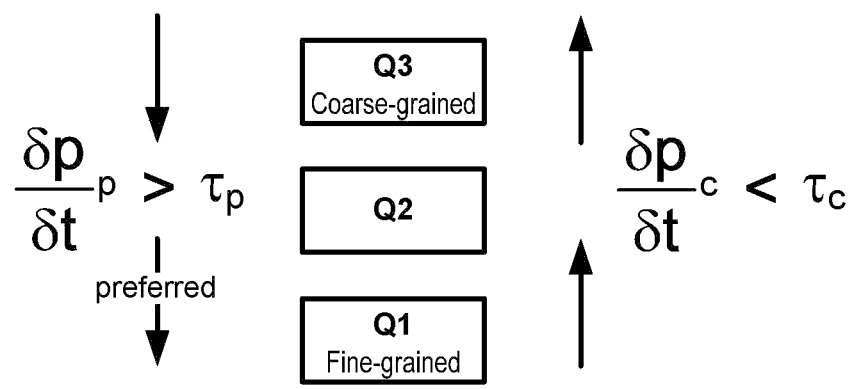
FIGS. 10A and 10B illustrate two different examples of adaptive queuing.
Figure 10B:
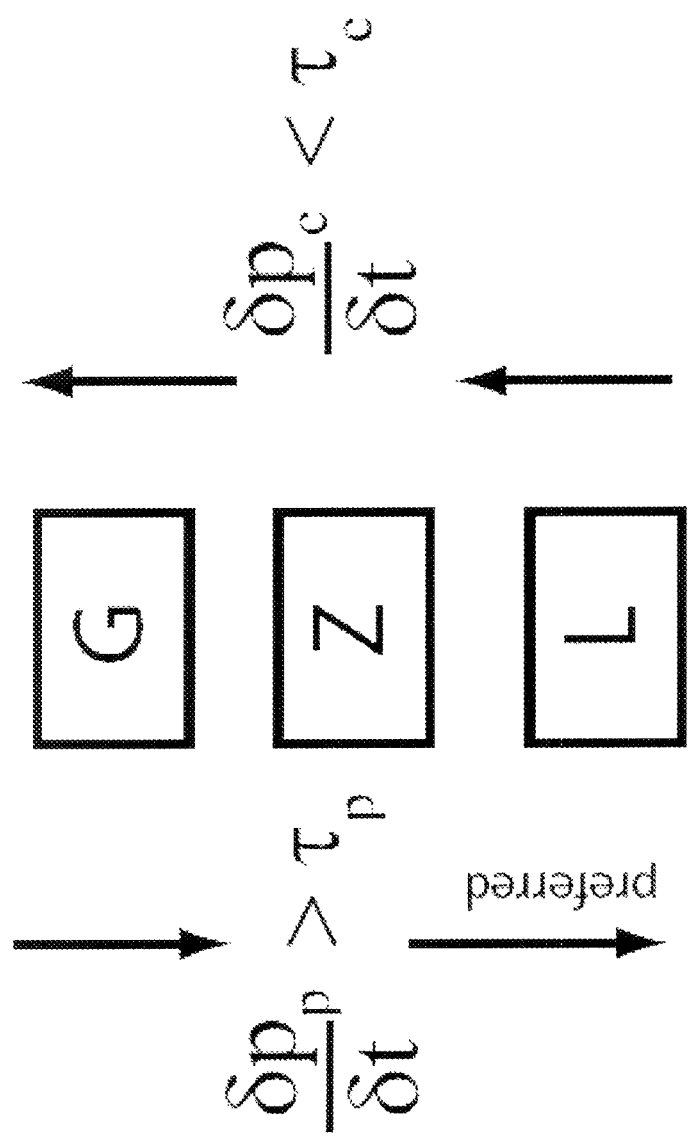

One approach is to periodically sample queue pressure and modify the granularity accordingly. In one embodiment, the adaptation is between any type of queue topologies having different levels of granularity, e.g., between coarse and fine grained queues, which is illustrated in FIG. 10A. For example, if there are at least two different levels of granularity (e.g., two or three) in queue topology the adaptation can be between any of the different levels of granularity. In another embodiment the adaptation is between three specific queue schemes: global (G), zone (Z) and local (L), which is illustrated in FIG. 10B, where the G, Z, and L queues were described previously. However, more generally the adaptation can be between any set of at least two different queue topologies.

Producer pressure is given by the time rate of change of the production of tasks. Producer pressure can be measured by the number of queue locks that incur at least one failure (i.e., the queue lock was held by some other thread.

Consumer pressure is the time rate of consumers consuming tasks. Consumer pressure can be measured by counting the number of task steals performed by a thread.

The pressure counts may be maintained in a global array with per-thread entries. An "adaptation controller" thread periodically samples the count and triggers any required change in adaptation scheme. Pressures are compared against predefined threshold values, such as $\tau_p$ and $\tau_c$. In one implementation these threshold values are static and are tuned by hand for a given application. However, more generally the threshold values could also be determined using other techniques or dynamically determined based on empirical results.

The adaptive scheme also allows different arrangements for different zones. For example, tiles in zone 0 may be using a global queue whilst tiles in zone 1 use a zone queue. There is always only one global queue and thus any zone using a G scheme will share the same queue.

In one embodiment of a method, during the execution, the operations of the adaptive queuing scheme are as follows:
1. Periodically sample the consumer and producer pressure of the current queue;
2. Based on the predefined queue transition rules, dynamically adjust the queues. In one example, fine-grained queue schemes are preferred if the producer pressure is larger than a threshold value.

Construction of the adaptive queuing scheme for a given platform in one method involves the following steps:
1. Implement different queuing schemes ranging from a single coarse-grained shared queue, to fine-grained per-core queues coupled with work-stealing;
2. Define the measurement of queue pressure for both producers and consumers of tasks, for example the number of queue locks that incur at least one failure;
3. Define queue state transitions, where the producer pressure is given by $$P_{producer} = \frac{\delta p_p}{\delta t},$$

and consumer pressure by $$P_{consumer} = \frac{\delta p_c}{\delta t}.$$

Figure 11:
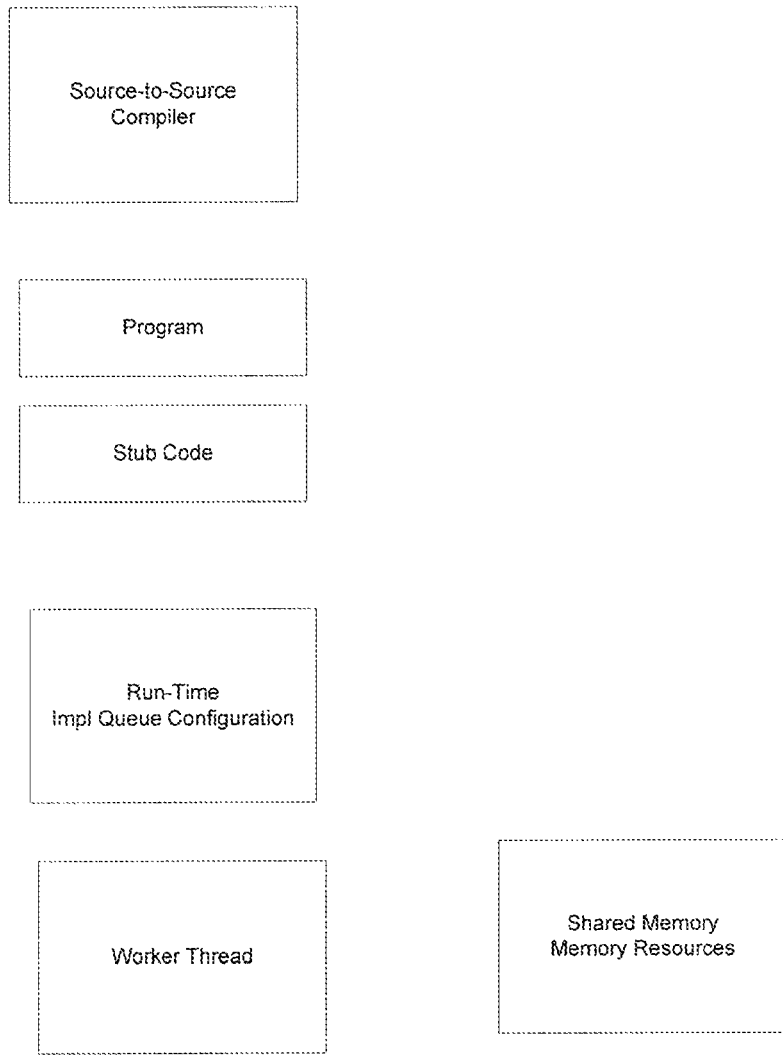
FIG. 11 illustrates run time compilation of a run time configuration in which there is an implied queue configuration in which a worker thread monitors a shared memory resource and adapts queue topology based on queue pressure.

The adaptation may be performed using the task manager/scheduler 300 of the run time system. As previously described, the role of the task manager is to map logical program 'tasks' to physical processing resources. A task manager performs task scheduling both spatially (distribution across cores) and temporally (time slicing). Queuing architectures for task management range from a single coarse-grained shared queue, with no need for work-stealing (the process of actively taking lightweight tasks from remote queues), to fine-grained per-core queues coupled with work-stealing. Heavy task loads are better suited to schemes that support multiple queues that relieve pressure on a single queue. Nevertheless, fine-grained queues may incur overhead of checking multiple queues in light loading situation. Furthermore, changing application behaviors, with respect to task creation, makes it difficult to fix queue-granularity a priori. To address this problem, an adaptive queuing scheme is used that changes queue arrangement and granularity over time in response to changes in runtime queue pressure. As illustrated in FIG. 11 runtime compilation may be performed to define a task management architecture having a queue configuration with a worker thread monitoring a shared memory resource and adapting the queue topology. In particular, in one implementation a single worker thread may perform the monitoring and adaptation in order to minimize the overhead associated with monitoring and adaptation. The worker thread may periodically monitor the queues in a shared memory resource. Additionally, the worker thread may adapt the queue topology, such as by adjusting queue locks or pointers.

It will be understood that the method of task management to adapt queue topology may be implemented as a non-transitory computer readable medium storing the code for the task management compilation. Additionally, the compiled code is also stored on a local memory that is a computer readable medium.

Locking Schemes for Queue Topologies

While queue topologies map the tasks to different threads/cores, locking schemes need to be implemented to synchronize the accesses to each task queue within the topologies. It ensures that any access to a task queue is exclusive and no race condition is introduced.

Exemplary locking schemes for the queuing topologies may include any type of locking scheme that can be used to protect queue accesses. Locks can be broadly classified into two categories, spinlocks and system locks (e.g., mutexes, semaphores). The idea of spinlocks is to actively poll state (i.e., busy-wait) in order to take a lock. Although there are many different algorithms, they rely on the availability of processor-level atomic instructions such as compare-and-swap (CAS) or test-and set. Spinlocks can be used in user-space without any need to interact with the kernel and therefore scale well with increasing numbers of cores. A well understood problem with spinlocks is that of starvation. In a producer-consumer scenario (such as a shared queue), as the number of consumers increases the amount of busywork the processor is performing overall, increases. Access is made approximately fair through preemption and anti-starvation mechanisms (e.g., dynamic priority inflation) of the system scheduler. This fairness means that the portion of time available to a producer decreases, ultimately leading to the situation where a producer cannot enqueue any new tasks because of the busy-work spinning of the consumer queues. This scenario can also be reversed whereby consumer threads are starved by producer-side threads. Another inhibitor of scalability with respect to spinlocks is the generally poor scalability of processor-level CAS operations (this is of course processor design dependent). One approach that can be used to alleviate CAS related degradation is for the consumer threads to perform an unsafe test on the queue size so as to not need to hold the processor lock whilst testing for availability of tasks on the queue. When the unsafe test is positive (i.e. there are items available) the thread performs a safe test and lock. The following pseudo-code excerpt illustrates this approach:

```
task_t * Pop ( ) {
if( queue . size == 0) return NULL ;
SPINLOCK_LOCK ;
if( queue . size == 0) {
SPINLOCK_UNLOCK ;
return NULL ;
}
task_t * result = queue .pop ( );
SPINLOCK_UNLOCK ;
return result ;
}
```

An alternative implementation of locks is to use kernel-based primitives such as mutex or semaphore. They generally facilitate synchronization via the kernel. In Linux, and many other operating systems, threads that are waiting on a mutex or semaphore are moved out of the ready scheduling queues into a separate pending queue. When the lock becomes available, or the semaphore is incremented, the system selects a waiting thread, assigns it the corresponding lock/element and wakes-up the thread by placing it on the ready queue.

The main advantage of system-level synchronization mechanisms is that threads that are waiting for locks do not busy-wait. Thus, the consumers-starving-producers and vice-versa phenomena do not occur. Nevertheless, the performance of mutexes and semaphores are not as good as spinlocks due to the involvement of a centralized operating system kernel. For example, each time a thread fails to successfully take a lock, it must trap into the kernel (via a software interrupt), take kernel-level spinlocks for the scheduling queues, migrate the task from the running to the pending queue and then perform a context switch. This type of contention can cause the scalability to be degraded significantly as both the number of locks and threads increases. To synchronize shared task queues, spinlocks are more desirable than kernel-based primitives. This is because they minimize operating system involvement and are capable of achieving lower wake up latencies, especially for shared memory systems. When more task queues are created, spinlocks also provide better scalability.

In order to reduce contention on locks that are protecting shared queues we can choose more advanced "lockfree" queue designs. Similar to spinlocks, lock-free queues rely on processor-level atomic CAS instructions. The key idea is to use the result of a CAS operation to determine if a queue access operation has been performed exclusively. If so, the operation is considered successful. Otherwise, the thread must retry (similar to transactional memory). The main advantage of lock-free queues is that they reduce the granularity of the locks down to the instruction level. As a result, they ultimately reduce performance degradation due to contention and achieve better fairness.

Exemplary Parallel Programming Language, Compiler, Runtime Architecture for Lightweight Tasks, and Task Creation Zone queuing and adaptive queuing was tested using a 64 core tile processor architecture and an enhanced programming language developed by the inventors, (hereinafter described as SNAPPLE). Aspects of SNAPPLE related to the tested implementation will now be described.

SNAPPLE provides new abstractions that enable well-known concurrent design patterns to be easily implemented without the developer becoming overburdened with the details of underlying thread management. This new language provides an elegant concurrent programming solution that increases productivity for existing C++ developers and can easily integrated with existing C/C++ code. SNAPPLE task abstractions are compiled down to lightweight tasks, which are managed by a cooperative user-level scheduling scheme that can schedule tasks without depending on a centralized kernel-based scheduler that quickly becomes a performance bottleneck. Within the context of manycore MIMD processors, the subtleties of the underlying task management architecture can have significant impact on achieved performance. Furthermore, many traditional multi-threaded programming techniques (e.g., mutexbased synchronization) do not scale beyond only a few cores.

One approach is to remove the dependency on traditional multithreading as well as other unsafe programming abstractions such as OpenMP™, which are inherently difficult to program correctly.

A SNAPPLE compiler may be implemented as a source-to-source compiler. A prototype used the ROSE compiler framework, which is an open source complier. ROSE provides off-the-shelf capabilities for C/C++ and FORTRAN source code re-writing and program analysis at the Abstract Syntax Tree (AST) level. The approach of using source-to-source transformation allows us to decouple the solution from the underlying platform, permitting SNAPPLE to be used on any processor that supports standardized C/C++ and shared memory. This also allows rapid porting to future MIMD processors as they become available.

Lightweight tasks provide the fundamental means to create concurrency in the program. The SNAPPLE compiler builds the necessary code to create lightweight task objects and schedule them accordingly.

A basic construct for lightweight tasks is the async-finish block, inspired by the X10 programming language. This construct provides a mechanism for task creation and synchronization, as well as a scoping mechanism for data sharing/copying. The following pseudo-code excerpt illustrates the use of these constructs in a recursive Fibonacci function:

```
int fib( int n) {
if (n < 2) return n;
else {
unique int x,y;
finish {
async { x = fib(n -1); }
async { y = fib(n -2); }
}
return (x+y);
}
```

The async keyword defines a new lightweight task that can safely execute in parallel with the calling task, as well as with other async-created tasks. The finish construct defines an implicit barrier whereby the code that follows the finish block is only executed after all of the tasks spawned within the finish block run to completion. Lightweight tasks are transparently mapped to different system threads by the SNAPPLE runtime. A program can potentially create millions of tasks for the sake of expressivity that are cleanly separated from the system threads needed to exploit physical parallelism. Notice that in the previous excerpt the tasks have access to all lexically defined variables. All variables are passed to the tasks by copy and hence updates to the variables are not visible outside the asynchronous block. Sharing (i.e. passing) pointers into tasks is disallowed. Such pointers might potentially point to the stack of other tasks and possibly corrupt them. Sharing heap allocated objects through pointers is supported through the use of special shared data types. In the previous example, variables x and y are tagged as unique. This restricts each variable to only one asynchronous block. Static analysis also ensures that unique variables are not accessed concurrently in the parent scope. In return, the variables are passed by reference and thus can be passed efficiently into the async scope, without the need for synchronization. This capability is needed for efficient accumulation.

The exemplary SNAPPLE compiler creates three different types of task. These are asynchronous (A), continuation (C), and yields (Y). A-type tasks are created for each async construct. C-type tasks are created when a thread reaches the closing scope of a finish block and detects that nested asynchronous tasks still need to be serviced. Finally, Y-type tasks are created in response to yield operations (discussed in the next section). Each of the three tasks are managed in a separate queue. Kernel threads, that are bound to specific cores, service the queues. A-queues are serviced at the highest priority. If an A-queue is empty, then the C-queue is serviced and then, as the C-queue becomes empty, the Y-queue is serviced. This ensures that A-tasks take priority over C and Y tasks, which improves performance by servicing A and C task dependencies first.

As the industry moves towards manycore processors that offer more parallel compute power than the number of available lightweight tasks speculation becomes an important tool. For example, a parallel tree search could be implemented by spawning a task to search each of the branches of a node. When one of the tasks finds the target all others should be terminated in order to release compute resources. SNAPPLE provides two primitives for task cancellation; an exit point, designated through exit if so, which defines a point at which a task checks (polls) for an exit notification, and terminate which notifies all tasks spawned within the same finish block scope to terminate at the next exit point. Exit notifications are also propagated down into nested async-finish blocks. Synchronous termination through a known exit point is important since any asynchronous termination might leave the system in an inconsistent state. Consider the following example:

```
void search ( Tree * node , int v)
{
exit_if_so ;
if (node ->val == v) {
terminate ;
}
finish {
async { search (node ->left , v); }
async { search (node ->right , v); }
}
}
```

In the above example, a binary tree is concurrently searched for value v. Notice that, the exit point is polled at the node entry and terminate is invoked on a successful match. When terminate is invoked, the calling thread abandons the task; all other sibling tasks (and their children) will either synchronously terminate at the next exit point or run to completion. Tasks may also explicitly give up the processor/core to another lightweight task via the yield construct. This construct effectively wraps the current thread state into a continuation context and then enqueues itself on the Y-queue. Yielding is an important capability that is required to effectively support I/O operations and also allows the programmer to govern the granularity of time slice occupation.

Exemplary Shared Memory Model for Multiple Concurrent Threads

One of the challenges in parallel programming is avoiding consistency errors caused by uncontrolled access of shared data by multiple concurrent threads (i.e. race conditions). The traditional approach to this problem is to use locks to mutually exclude access (in what is termed the critical section) to the shared data. In a multithreaded programming environment one might use mutex, semaphore, read-write locks or spin lock synchronization to achieve this. Nevertheless, using locks correctly and efficiently is inherently difficult. Incorrect patterns of usage can easily lead to deadlock, livelock and other related problems. Deciding on an appropriate design that maps locks to data can be challenging. Bad design choices can quickly lead to poor performance and scaling, particularly in a manycore platform. The problem is primarily an issue of deciding an effective balance between locks and data granularity; e.g., should the whole queue be locked, each single element locked, or something in between? Deriving an efficient solution comes down to understanding the access patterns (in terms of read, write and modify) of the application. With an understanding of this behavior a balance between performance and correctness can be easily struck. Our approach to this problem is to remove the concern of "lock design" from the typical developer.

Data can only be shared across tasks through the use of predefined shared memory types. These types, implemented as C++ classes, provide an interface to access the data using a strictly ordered acquire-use-release pattern—they are implemented by experts.

In order to gain access to the data (facilitated through the usemember) a task must acquire the resource by invoking the acquire method. Once a task has finished accessing the data it is released with the release method. Shared data acquisitions cannot be nested, even across different instances.

If the programmer wishes to perform some operation on multiple shared data variables at the same time, he/she can use them within an atomic block construct. This will implicitly take multiple locks for the duration of the atomic block (the programmer in this instance does not call acquire and release). Atomic sections are implemented by inferring the locks that are required to ensure mutual exclusion of the atomic section. In order to prevent deadlock, the locks are sorted before they are implicitly taken.

The following pseudo-code excerpt illustrates a possible scenario atomically operating on shared data r1 and r2:

```
atomic {
/* implicit lock of r1 , r2 */
const int * p = r1. use(x);
const int * q = r2. use(x);
*p = *q = 1;
} /* implicit unlock of r1 , r2 */
```

The SNAPPLE compiler also includes analyses that will statically enforce the shared memory model and ensure that partial ordering constraints are met (analysis is conservative).

Exemplary Task Management Architecture and Flexible Task Management Overview

Lightweight tasks, defined by using SNAPPLE language constructs, are managed by a user-level cooperative multitasking runtime. The underlying implementation is not predefined by the language design. However, an exemplary architecture is based on a non-preemptive execution scheme in which each task either runs to completion or voluntarily gives up access to the CPU. This exemplary execution scheme has two benefits: 1.) Non-preemptive execution helps to maintain locks in a clean state and thus avoids deadlock; it is also more feasible in a multicore architecture whereby specific cores can be reserved for the application. 2.) Managing tasks in the application and in user-space provides a scalable solution, with respect to larger MIMD processors, by avoiding putting load on a centralized (non-scalable) kernel/OS scheduler.

This approach has been ported to x86, ARM and Tile processor platforms. An exemplary tile processor is 64-core MIMD processor that is a 64-way MIMD design, arranged in an 8×8 grid). Each core is 32 bit VLIW, operating at 866 MHz in around a 0.5 W power envelope. The total theoretical maximum throughput is 443 billion operations per second. The TILE processor provides a user-programmable switched interconnect, as well as fully cache coherent shared memory. Four separate memory controllers manage a total of 8 GB of off-chip DDR2 memory.

In a prototype architecture, each core runs a single OS-level thread, which services lightweight task contexts that are queued in the system. Each system thread is pinned down to a specific core by setting the thread's affinity mask. Each core is explicitly reserved for the SNAPPLE runtime by configuring the processor's hypervisor accordingly. These reserved cores are not visible to the Linux OS and are not used to service kernel tasks or interrupts.

One of the design features of SNAPPLE and its runtime is the ability to flexibly change the underlying task management scheme. Specifically, different queue arrangements and scheduling policies can be easily "plugged in" depending on specific application and platform requirements. This capability allows the exploration of design trade-offs with respect to different task management schemes. The key design attributes include, queue topology and sharing, load-balancing/workstealing scheme and synchronization mechanism for shared queues.

The exemplary SNAPPLE compiler translates async constructs into task creation (potentially guarded by a dynamic threshold test). At the end of the finish block, threads that have completed their serial execution and have created asynchronous tasks "wait" for the completion of child tasks and deeper descendants. The execution beyond the finish block's closing scope we term the thread's continuation. Although the logical semantics are defined as the parent task waits for its children to complete, the thread does not actually block. Instead the continuation itself is wrapped up into a lightweight task and queued accordingly. One implementation adopts a "help-first" policy. This means that created lightweight tasks are queued by the creating task itself. After queuing a task, the parent continues execution of code following the creation point (i.e. after the async construct). An alternative approach known as "work-first" is to queue the continuation as opposed to queuing the new task. In general, the help-first performs better for deeper recursion. The SNAPPLE runtime also uses dynamic thresholding to limit the amount of memory used by the creation of continuation contexts (including a newstack frame). When a certain memory footprint threshold (or some other dimension) is reached, any new async-finish constructs are executed serially. This approach is effective for deeply recursive task creation that creates a large number of continuation contexts.

Experimental Results on Performance and Scaling

Benchmark tests were performed. To measure the performance of different queuing schemes, measurements were taken for a multi-core Tile processor for each of the four queuing schemes; global queue (G), zone-queues (Z), local-queues (L) and the adaptive scheme (A). Data was normalized against the global (G) scheme. The underlying queue implementations for all of the schemes tested is based on the lock-free queue scheme developed by M. M. Michael and M. L. Scott, "Simple, fast, and practical non-blocking and blocking concurrent queue algorithms," in PODC, pages 267-275, 1996, the contents of which are hereby incorporated by reference. This scheme provides concurrent enqueue and dequeue operations on a FIFO queue through the use of compare-and-swap (CAS) operations on head and tail pointers. We chose a CAS-based lock-free queue even though the TILEPro64 processors only supports Test-and-Set H/W instructions; CAS operations are implemented through kernel-level fast mutexes. Although scaling emulated-CAS to hundreds of cores is possibly questionable, data for 64-cores shows good and the lock-free queue consistently outperforms the spinlock protected queue. Furthermore, the next-generation of TILE processors (the GX-series) are known to support H/W level CAS.

Figure 12:
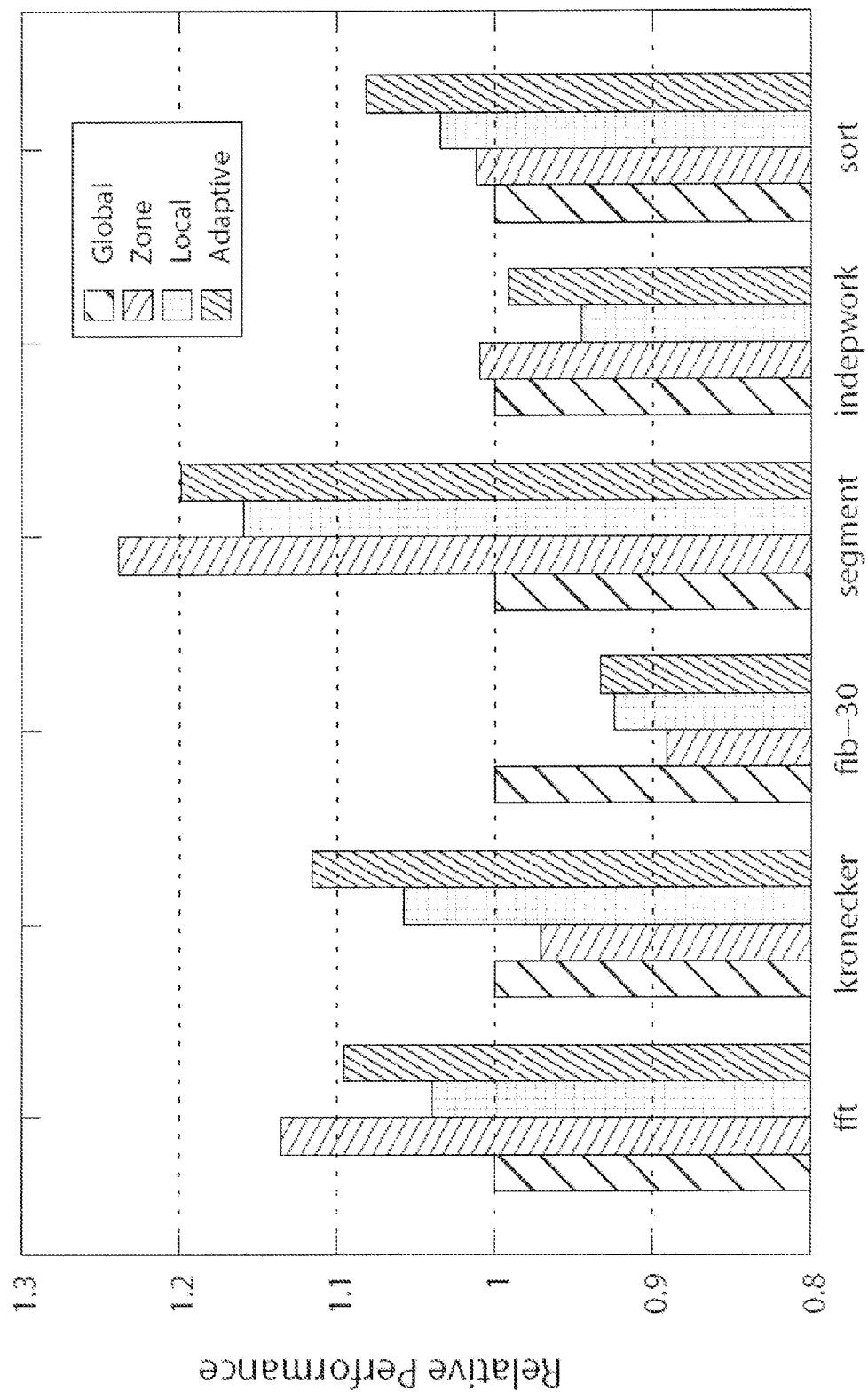
FIG. 12 illustrates benchmark performance results of different queuing schemes.

The results, given in FIG. 12, indicate a mixed result. On average, the adaptive scheme gave a 10% improvement over the local scheme. The results also show that the zone-based scheme provides, on average, a 7% improvement over a local queue scheme. Furthermore, the global scheme is generally the worst performer (on average 1% less speedup than the local scheme) with the exception of the Fibonacci benchmark.

We believe that the reason for the global scheme performing well in the Fibonacci benchmark is due to its deep recursion and the effects of dynamic thresholding that limits the memory usage, and thus number of tasks (recursive task creation generates a large number of continuations which require new stacks to be allocated and thus decrease the task-to-memory ratio significantly). With a relatively small number of tasks the global scheme predictably performs well.

What is claimed is:

1. In a Multiple Instruction Multiple Data (MMID) architecture in which tasks are mapped to task queues in a first mapping, task queues are mapped to threads in a second mapping, and threads are mapped to processing resources in a third mapping, a method comprising:
monitoring a queue pressure of at least one task queue; and
adapting a queue topology of the architecture based on said queue pressure and at least one threshold level associated with said queue pressure, wherein said queue topology is selected from at least two different queue topologies;
wherein said first mapping, said second mapping and said third mapping are based on said queue topology; and
wherein said at least two different queue topologies comprise a fine grained queue topology for reducing contention when said queue pressure is greater than said at least one threshold level, and a coarse grained queue topology for reducing computational overhead when said queue pressure is less than or equal to said at least one threshold level.

2. The method of claim 1, wherein said at least two different queue topologies includes queue topologies having different levels of queue granularities.

3. The method of claim 1, further comprising using a sampling thread to sample queue pressure of at least one task queue and to select said queue topology for all worker threads.

4. The method of claim 3, wherein:
said queue pressure is based on a task producing pressure of at least one task queue and a task consuming pressure of at least one task queue, wherein a task producing pressure of a task queue is based on a number of failed queue locks relating to said task queue, and wherein a task consuming pressure of a task queue is based on a number of tasks relating to said task queue that have migrated.

5. The method of claim 4, wherein:
said fine grained queue topology is selected as said queue topology if a task producing pressure of at least one task queue is greater than said at least one threshold level; and
said coarse grained queue topology is selected as said queue topology if a task producing pressure of at least one task queue is less than or equal to said at least one threshold level.

6. The method of claim 3, wherein said sampling thread monitors a shared memory resource associated with at least one task queue and modifies a queue pointer of each worker thread to adjust said queue topology.

7. The method of claim 1, wherein each queue topology defines a mapping between one or more tasks and one or more threads.

8. In a Multiple Instruction Multiple Data (MMID) architecture, a method of operating a task manager logically programming tasks to physical processing resources, comprising:
monitoring a shared memory resource supporting at least one task queue, wherein each task queue comprises at least one task mapped to said task queue; and
adaptively changing a queue configuration of the architecture based on a queue pressure of said at least one task queue and at least one threshold level associated with said queue pressure, wherein said queue configuration is selected from at least two different queue configurations;
wherein a task is mapped to a task queue based on said queue configuration; and
wherein said at least two different queue configurations comprise a fine grained queue configuration for reducing contention when said queue pressure is greater than said at least one threshold level, and a coarse grained queue configuration for reducing computational overhead when said queue pressure is less than or equal to said at least one threshold level.

9. The method of claim 8, wherein:
said queue pressure is based on a task producing pressure of at least one task queue and a task consuming pressure of at least one task queue, wherein a task producing pressure of a task queue is based on a number of failed queue locks relating to said task queue, and wherein a task consuming pressure of a task queue is based on a number of tasks relating to said task queue that have migrated.

10. The method of claim 9, wherein:
said fine grained queue configuration is selected as said queue configuration to reduce contention if said queue pressure is greater than said at least one threshold level; and
said coarse grained queue configuration is selected as said queue configuration to reduce computational overhead if said queue pressure is less than or equal to said at least one threshold level.

11. The method of claim 10, wherein:
said coarse grained queue configuration comprises a shared global task queue for task creation/servicing volume to minimize cost of concurrency; and
said fine grained queue configuration comprises one of multiple distributed queues or multiple hierarchical queues.

12. The method of claim 8, wherein said monitoring is a periodic monitoring.

13. A Multiple Instruction Multiple Data (MMID) system, wherein lightweight tasks are mapped to task queues, and wherein task queues are mapped to threads, the system comprising:
multiple processing cores and associated links;
memory space for at least one task queue, wherein each task queue comprises at least one task mapped to said task queue; and
a task manager monitoring queue pressure of said at least one task queue and adapting a queue topology of the system based on said queue pressure and at least one threshold level associated with said queue pressure, wherein said queue topology is selected from at least two different queue topologies;
wherein a task is mapped to a task queue based on said queue topology;
wherein a task queue is mapped to a thread based on said queue topology; and wherein said at least two different queue topologies comprise a fine grained queue topology for reducing contention when said queue pressure is greater that than said at least one threshold level, and a coarse grained queue topology for reducing computational overhead when said queue pressure is less than or equal to said at least one threshold level.

14. The system of claim 13, wherein a queue pointer of at least one of worker thread is adapted to configure said queue topology.

15. The system of claim 13, wherein
said fine grained queue topology is selected as said queue topology to reduce contention if said queue pressure is greater than said at least one threshold level; and
said coarse grained queue topology is selected as said queue topology to reduce computational overhead if said queue pressure is less than or equal to said at least one threshold level.

16. The system of claim 13, wherein said queue topology is selected from at least two different queue topologies that include queue topologies having different levels of queue granularities.

17. The system of claim 13, further comprising using a sampling thread to sample queue pressure of at least one task queue and select said queue topology.

18. The system of claim 17, wherein said queue pressure is based on a task producing pressure of at least one task queue and a task consuming pressure of at least one task queue, wherein a task producing pressure of a task queue is based on a number of failed queue locks relating to said task queue, and wherein a task consuming pressure of a task queue is based on a number of tasks relating to said task queue that have migrated.

19. The system of claim 17, wherein:
said fine grained queue topology is selected as said queue topology if a task producing pressure of at least one task queue is greater than said at least one threshold level; and
said coarse grained queue topology is selected as said queue topology if a task producing pressure of at least one task queue is less than or equal to said at least one threshold level.

20. The system of claim 17, wherein said sampling thread monitors a shared memory resources associated with at least one task queue and modifies an attribute of said at least one task queue to adjust said queue topology.

21. A computer program product for a Multiple Instruction Multiple Data (MMID) architecture in which tasks are mapped to task queues, task queues are mapped to threads in a second mapping, and threads are mapped to processing resources in a third mapping, comprising computer code stored on a non-transitory computer readable medium to implement a method comprising:
monitoring a queue pressure of at least one task queue; and
adapting a queue topology of the architecture based on said queue pressure and at least one threshold level associated with said queue pressure, wherein said queue topology is selected from at least two different queue topologies;
wherein said first mapping, said second mapping and said third mapping are based on said queue topology; and
wherein said at least two different queue topologies comprise a fine grained queue topology for reducing contention when said queue pressure is greater than said at least one threshold level, and a coarse grained queue topology for reducing computational overhead when said queue pressure is less than or equal to said at least one threshold level.

* * * * *